(12) United States Patent
Mital et al.

(10) Patent No.: US 8,943,507 B2
(45) Date of Patent: Jan. 27, 2015

(54) PACKET ASSEMBLY MODULE FOR MULTI-CORE, MULTI-THREAD NETWORK PROCESSORS

(76) Inventors: Deepak Mital, Orefield, PA (US); James Clee, Orefield, PA (US); Jerry Pirog, Easton, PA (US)

( * ) Notice: Subject to any disclaimer, the term of this patent is extended or adjusted under 35 U.S.C. 154(b) by 680 days.

(21) Appl. No.: 12/971,742

(22) Filed: Dec. 17, 2010

(65) Prior Publication Data

US 2011/0222540 A1    Sep. 15, 2011

Related U.S. Application Data

(63) Continuation-in-part of application No. 12/782,379, filed on May 18, 2010, and a continuation-in-part of application No. 12/782,393, filed on May 18, 2010, now Pat. No. 8,255,644, and a continuation-in-part of application No. 12/782,411, filed on May 18, 2010, now Pat. No. 8,407,707.

(60) Provisional application No. 61/313,399, filed on Mar. 12, 2010, provisional application No. 61/412,019, filed on Nov. 10, 2010.

(51) Int. Cl.
    *G06F 7/68* (2006.01)
    *G06F 15/167* (2006.01)
    *G06F 9/38* (2006.01)

(52) U.S. Cl.
    CPC ............ *G06F 15/167* (2013.01); *G06F 9/3851* (2013.01); *G06F 9/3885* (2013.01)
    USPC .......................................... 718/101; 718/102

(58) Field of Classification Search
    CPC .......................................................... G06F 7/68
    USPC .......................................................... 718/101
    See application file for complete search history.

(56) References Cited

U.S. PATENT DOCUMENTS

| 4,622,631 | A | 11/1986 | Frank et al. |
| 5,623,698 | A | 4/1997 | Stephenson et al. |
| 5,892,766 | A | 4/1999 | Wicki et al. |
| 5,943,283 | A | 8/1999 | Wong et al. |
| 6,038,630 | A | 3/2000 | Foster et al. |
| 6,195,335 | B1 | 2/2001 | Calvignac et al. |

(Continued)

FOREIGN PATENT DOCUMENTS

GB        2372172        8/2002

OTHER PUBLICATIONS

Braden et al; RFC 2309: Recommendations on Queue Management and Congestion Avoidance in the Internet; Apr. 1998, USA.

*Primary Examiner* — Thomas Mansfield

(57) ABSTRACT

Described embodiments provide a packet assembler for a network processor. The network processor includes a plurality of processing modules for processing received packets into one or more processed-packet portions. A shared system memory of the network processor receives processed-packet portions corresponding to packet assemblies. Each of the packet assemblies has associated tasks. A packet assembly processor constructs an output packet for each packet assembly from the processed-packet portions in accordance with instructions from the tasks associated with the packet assembly. The packet assembly processor coordinates storage of the processed-packet portions for each output packet that is read from the system memory based on the instructions from the tasks associated with the corresponding packet assembly.

37 Claims, 6 Drawing Sheets

(56) References Cited

U.S. PATENT DOCUMENTS

| | | |
|---|---|---|
| 6,567,564 B1 | 5/2003 | van der Wal |
| 6,636,932 B1 | 10/2003 | Regev et al. |
| 7,089,346 B2 | 8/2006 | Cebulla et al. |
| 7,234,018 B1 | 6/2007 | Purcell et al. |
| 7,461,208 B1 | 12/2008 | Caprioli et al. |
| 7,489,635 B2 | 2/2009 | Evans et al. |
| 7,567,508 B2 | 7/2009 | Charny et al. |
| 7,596,142 B1 | 9/2009 | MacAdam |
| 2002/0029214 A1 | 3/2002 | Yianilos et al. |
| 2002/0165985 A1 | 11/2002 | Chen et al. |
| 2003/0033026 A1 * | 2/2003 | Murphy ................ 700/9 |
| 2003/0033276 A1 | 2/2003 | Cheng et al. |
| 2003/0115417 A1 | 6/2003 | Corrigan |
| 2003/0123468 A1 | 7/2003 | Nong |
| 2004/0004968 A1 * | 1/2004 | Nassar ................ 370/401 |
| 2004/0057380 A1 * | 3/2004 | Biran et al. ........... 370/235 |
| 2004/0255209 A1 | 12/2004 | Gross |
| 2005/0027920 A1 | 2/2005 | Fitzsimmons et al. |
| 2005/0152352 A1 | 7/2005 | Jun et al. |
| 2005/0223107 A1 | 10/2005 | Mine et al. |
| 2006/0104281 A1 * | 5/2006 | Scarr et al. ........... 370/395.1 |
| 2006/0256783 A1 | 11/2006 | Ayrapetian et al. |
| 2007/0005852 A1 * | 1/2007 | Armstead et al. ...... 710/100 |
| 2007/0016756 A1 | 1/2007 | Hsieh et al. |
| 2007/0226798 A1 | 9/2007 | Sibert |
| 2008/0037429 A1 | 2/2008 | Lansing et al. |
| 2008/0162793 A1 | 7/2008 | Chu et al. |
| 2010/0110745 A1 * | 5/2010 | Jeddeloh et al. ........ 365/51 |
| 2010/0260198 A1 | 10/2010 | Rojas-Cessa et al. |

\* cited by examiner

FIG. 3
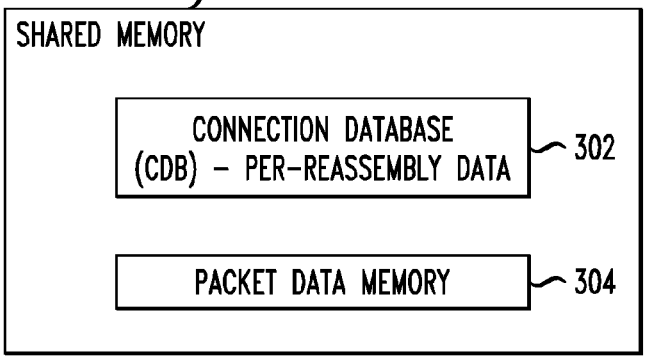
FIG. 4
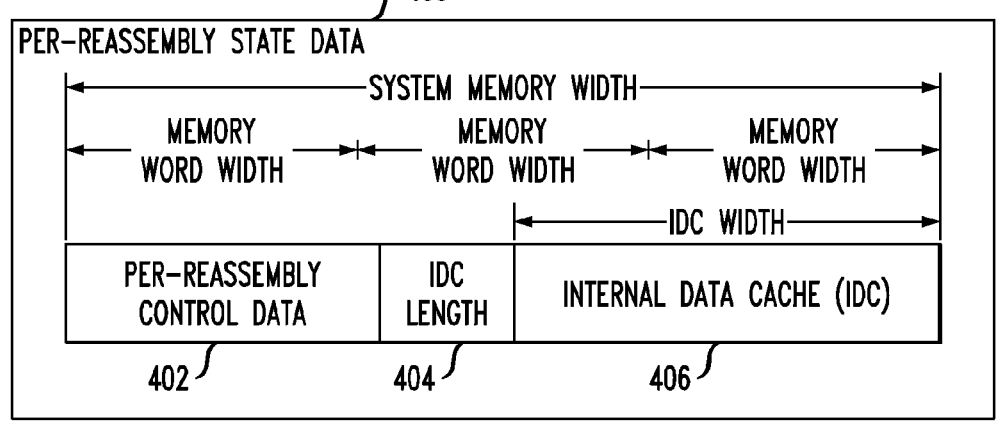
FIG. 5
| RELATIVE TIME | PACKET LENGTH | PAB ACTION | CYCLES TO MEMORY 116 |
|---|---|---|---|
| 0 | 16 | WRITE TO IDC | 0 |
| 1 | 16 | WRITE TO IDC | 0 |
| 2 | 16 | WRITE TO IDC | 0 |
| 3 | 16 | WRITE TO IDC | 0 |
| 4 | 80 | READ IDC (64); WRITE TO MEMORY 116 (80) | 1 SETUP + 1 WRITE |

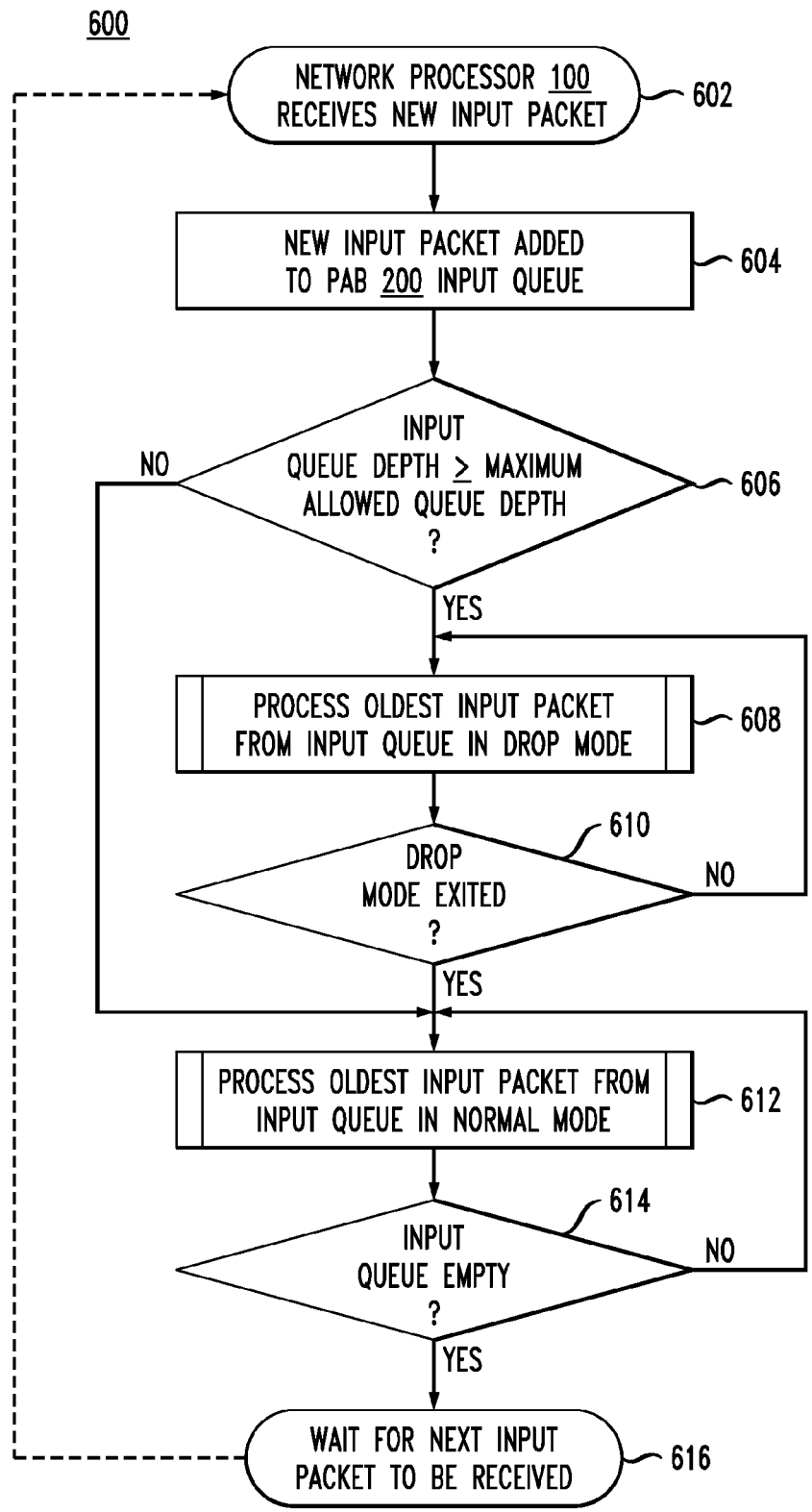

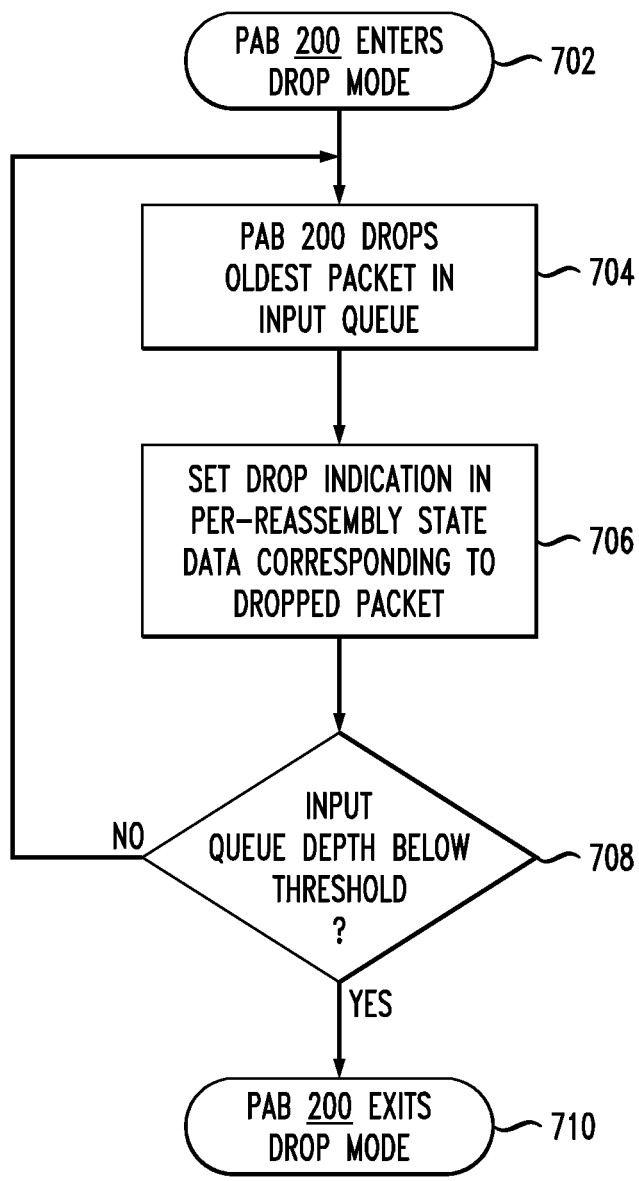

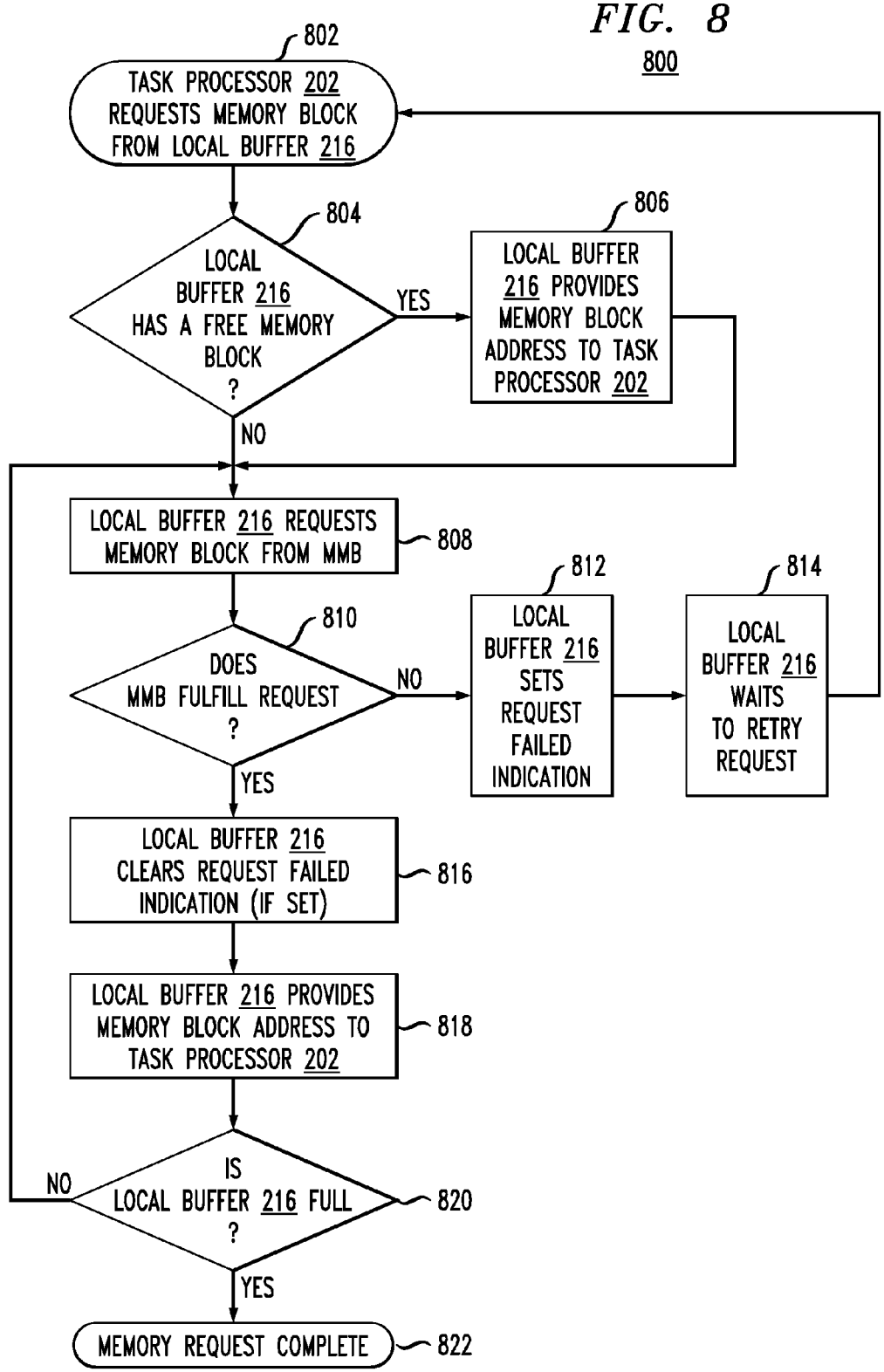

PACKET ASSEMBLY MODULE FOR MULTI-CORE, MULTI-THREAD NETWORK PROCESSORS

CROSS-REFERENCE TO RELATED APPLICATIONS

This application claims the benefit of the filing date of U.S. provisional application Nos. 61/313,399 filed Mar. 12, 2010 and 61/412,019 filed Nov. 10, 2010, the teachings of which are incorporated herein in their entireties by reference.

This application is a continuation-in-part, and claims the benefit of the filing date, of U.S. patent application Ser. No. 12/782,379 filed May 18, 2010, Ser. No. 12/782,393 filed May 18, 2010, now U.S. Pat. No. 8,255,644 and Ser. No. 12/782,411 filed May 18, 2010, now U.S. Pat. No. 8,407,707 the teachings of which are incorporated herein in their entireties by reference.

The subject matter of this application is related to U.S. patent application Ser. No. 12/430,438 filed Apr. 27, 2009, Ser. No. 12/729,226 filed Mar. 22, 2010, Ser. No. 12/729,231 filed Mar. 22, 2010, and Ser. No. 12/963,895 filed Dec. 9, 2010, the teachings of which are incorporated herein in their entireties by reference.

BACKGROUND OF THE INVENTION

1. Field of the Invention

The present invention relates to communication systems, in particular, to an accelerated processor architecture for network communications.

2. Description of the Related Art

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators to offload certain tasks from the general-purpose processors, such as encryption/decryption, packet data inspections, and the like. These newer network processor designs are traditionally implemented with either i) a non-pipelined architecture or ii) a fixed pipeline architecture.

In a typical non-pipelined architecture, general-purpose processors are responsible for each action taken by acceleration functions. A non-pipelined architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline architecture, packet data flows through the general-purpose processors and/or accelerators in a fixed sequence regardless of whether a particular processor or accelerator is required to process a given packet. This fixed sequence might add significant overhead to packet processing and has limited flexibility to handle new protocols, limiting the advantage provided by the using accelerators.

A network processor that generates output packets ("reassemblies") might typically store reassembly data in a shared memory due to the potentially large size of the reassemblies. A network processor might be implemented as a system on chip (SoC) having multiple processing modules that might concurrently access the shared memory. The overall packet throughput of the network processor therefore might depend in part on the efficiency of each processing module's interface to the shared memory. A typical shared memory might require some setup time (one or more clock cycle(s)) before each data transfer, during which no data is transferred. Further, the data interface to a shared memory might typically be many bytes wide, where one or more bytes are actually valid data.

Typical interfaces to shared memory might write to the system memory as soon as data is available from an input packet. This might result in wasted clock cycles accessing the shared memory since one or more setup cycles are required for each write transfer. Other typical interfaces to shared memory might wait for all the data of a single reassembly to be available, and then write all the data to the shared memory. This might reduce the number of setup cycles when input packets are long, but would still require many setup cycles if there are many small input packets. If there are many small input packets the memory efficiency might also suffer because for many write cycles less than the entire width of the memory interface is valid data. Further, a large amount of local storage might be required to hold the data for a single large input packet.

In general, a network processor requires some finite amount of time to process a given input packet. While the network processor is processing a given input packet, additional input packets might be received and might typically be stored in an input queue. If the rate at which input packets are received is greater than the rate at which the network processor can process the input packets, the input queue might become full and, thus, be unable to store any additional input packets. When the input queue becomes full, the network processor might drop one or more input packets.

Dropping input packets could result in the corresponding reassembly missing data, or including incorrect data. The network processor might eventually transmit the reassembly as an output packet, even though the data of the reassembly is incorrect due to the input packet being dropped. Further, there might not be any indication of this corruption to the destination device that receives the output packet. Alternatively, dropping input packets might also result in a given reassembly not being transmitted, if the dropped input packet is the final packet of the reassembly.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a packet assembler for a network processor. The network processor includes a plurality of processing modules for processing received packets into one or more processed-packet portions. A shared system memory of the network processor receives processed-packet portions corresponding to packet assemblies. Each of the packet assemblies has associated tasks. A packet assembly processor constructs an output packet for each packet assembly from the processed-packet portions in accordance with instructions from the tasks associated with the packet assembly. The packet assembly processor coordinates storage of the processed-packet portions for each output packet that is read from the shared memory based on the instructions from the tasks associated with the corresponding packet assembly.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 3 shows a block diagram of an exemplary shared memory of the network processor of FIG. 1;

FIG. 4 shows a block diagram of an exemplary per-reassembly state entry of the packet assembly submodule of FIG. 2;

FIG. 5 shows an exemplary table of memory operations of the packet assembly submodule of FIG. 2;

FIG. 6 shows a flow diagram of a packet reception process of the packet assembly submodule of FIG. 2;

FIG. 7 shows a flow diagram of a drop packet process of the packet assembly submodule of FIG. 2; and FIG. 8 shows a flow diagram of a memory block request process of the packet assembly submodule of FIG. 2.

DETAILED DESCRIPTION

In accordance with embodiments of the present invention, a packet assembler for a network processor is provided. The network processor includes a plurality of processing modules for processing received packets into one or more processed-packet portions. A shared system memory of the network processor receives processed-packet portions corresponding to packet assemblies. Each of the packet assemblies has associated tasks. A packet assembly processor constructs an output packet for each packet assembly from the processed-packet portions in accordance with instructions from the tasks associated with the packet assembly. The packet assembly processor coordinates storage of the processed-packet portions for each output packet that is read from the shared memory based on the instructions from the tasks associated with the corresponding packet assembly.

Table 1 defines a list of acronyms employed throughout this specification as an aid to understanding the described embodiments of the present invention:

TABLE 1

| USB | Universal Serial Bus | FIFO | First-In, First-Out |
|---|---|---|---|
| SATA | Serial Advanced Technology Attachment | I/O | Input/Output |
| SCSI | Small Computer System Interface | DDR | Double Data Rate |
| SAS | Serial Attached SCSI | DRAM | Dynamic Random Access Memory |
| PCI-E | Peripheral Component Interconnect Express | MMB | Memory Manager Block |
| SoC | System-on-Chip | μP | Microprocessor |
| AXI | Advanced eXtensible Interface | PLB | Processor Local Bus |
| AMBA | Advanced Microcontroller Bus Architecture | MPP | Modular Packet Processor |
| PAB | Packet Assembly Block | AAL5 | ATM Adaptation Layer 5 |
| MTM | Modular Traffic Manager | SED | Stream Editor |
| DBC | Data Buffer Controller | THID | Thread Identifier |
| HE | Hash Engine | PQM | Pre-Queue Modifier |

TABLE 1-continued

| SENG | State Engine | FBI | Function Bus Interface |
|---|---|---|---|
| TID | Task Identifier | CCL | Classification Completion List |
| SCH | Scheduler | SEM | Semaphore Engine |
| SPP | Security Protocol Processor | PCM | Per Context Memory |
| TIL | Task Input Logic | PDU | Protocol Data Unit |
| TCP | Transmission Control Protocol | PIC | Packet Integrity Checker |
| SDWRR | Smooth Deficit Weighted Round-Robin | CRC | Cyclic Redundancy Check |
| IP | Internet Protocol | | |

Figure 1:
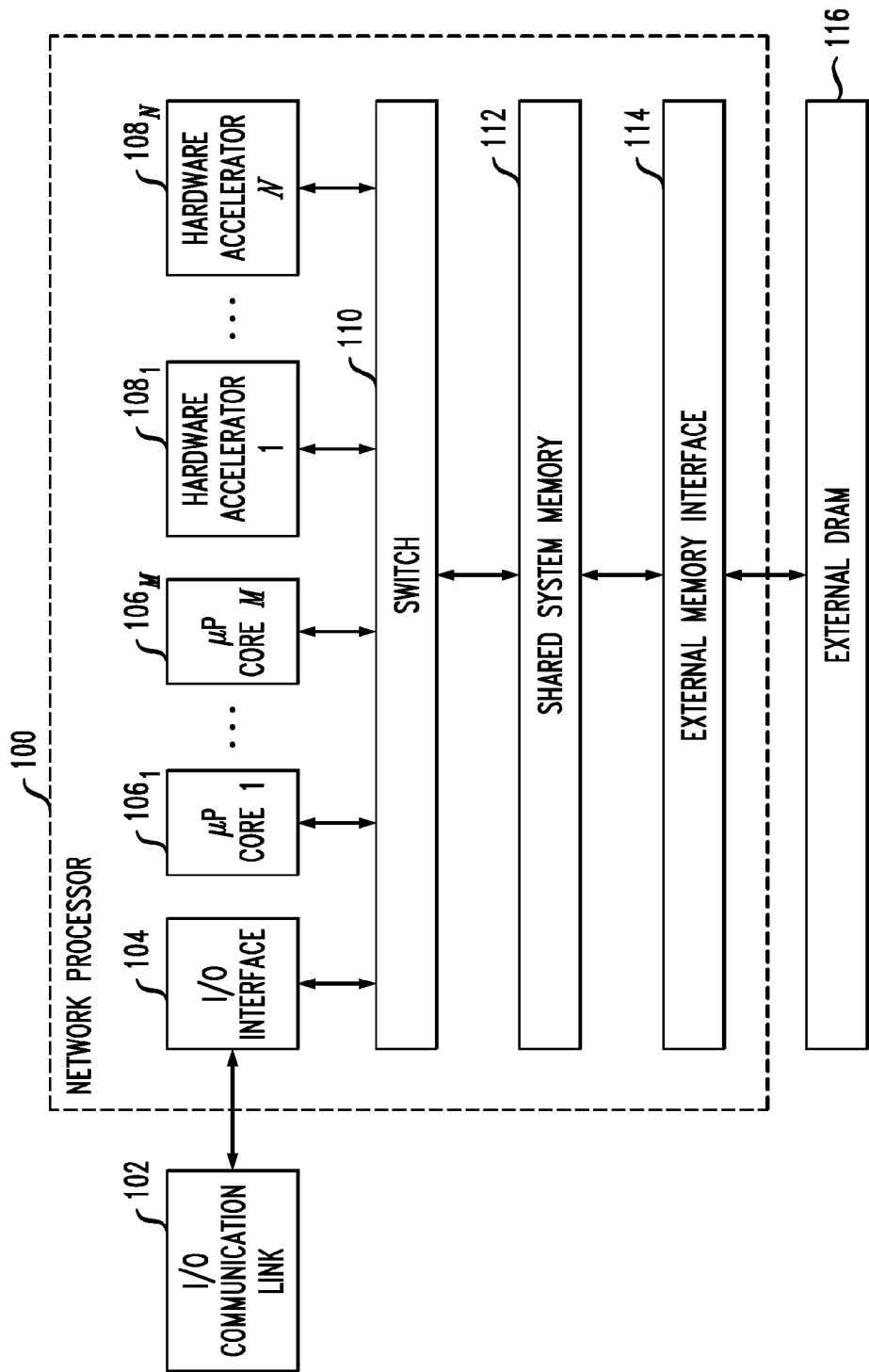
FIG. 1 shows a block diagram of a network processor operating in accordance with exemplary embodiments of the present invention.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (μP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, μP cores and hardware accelerators might be coupled to switch 110 that is coupled to shared memory 112. Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010.

I/O interface 104 might typically be implemented as hardware that connects network processor 100 to one or more external devices through I/O communication link 102. I/O communication link 102 might generally be employed for communication with one or more external devices, such as a computer system or a networking device, that interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various μP cores 106 and hardware accelerators 108. External memory interface 114 couples shared memory 112 to external memory 116 to provide off-chip storage of data not needed by the various μP cores 106 and hardware accelerators 108 to free space in shared memory 112. The μP cores and hardware accelerators might interact with each other as described in related U.S. patent application Ser. Nos. 12/782,379, 12/782,393, and 12/782,411, all filed May 18, 2010, for example, by one or more communication bus rings that pass "tasks" from a source core to a destination core. As described herein, tasks are instructions to the destination core to perform certain functions, and a task might contain address pointers to data stored in shared memory 112.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112. I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably received for a task and transmitted externally. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various μP cores 106 and hardware accelerators 108 of network processor 100 might include several exemplary types of processors or accelerators. For example, the various μP cores 106 and hardware accelerators 108 might include, for example, a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down different virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED becomes the outgoing packet data and can also update task parameters.

The RegEx engine is a packet search engine for state-based cross-packet pattern matching. The RegEx engine is multi-threaded accelerator. An exemplary RegEx engine might be implemented such as described in U.S. Pat. No. 7,439,652 or U.S. Patent Application Publication No. 2008/0270342, both of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove the need for replicating the data each time the data is needed. The MMB preferably tracks the memory allocations using a stack-based approach since a memory block recently released is preferably the next block to be allocated for a particular task, reducing cache trashing and cache tracking overhead.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization.

Figure 2:
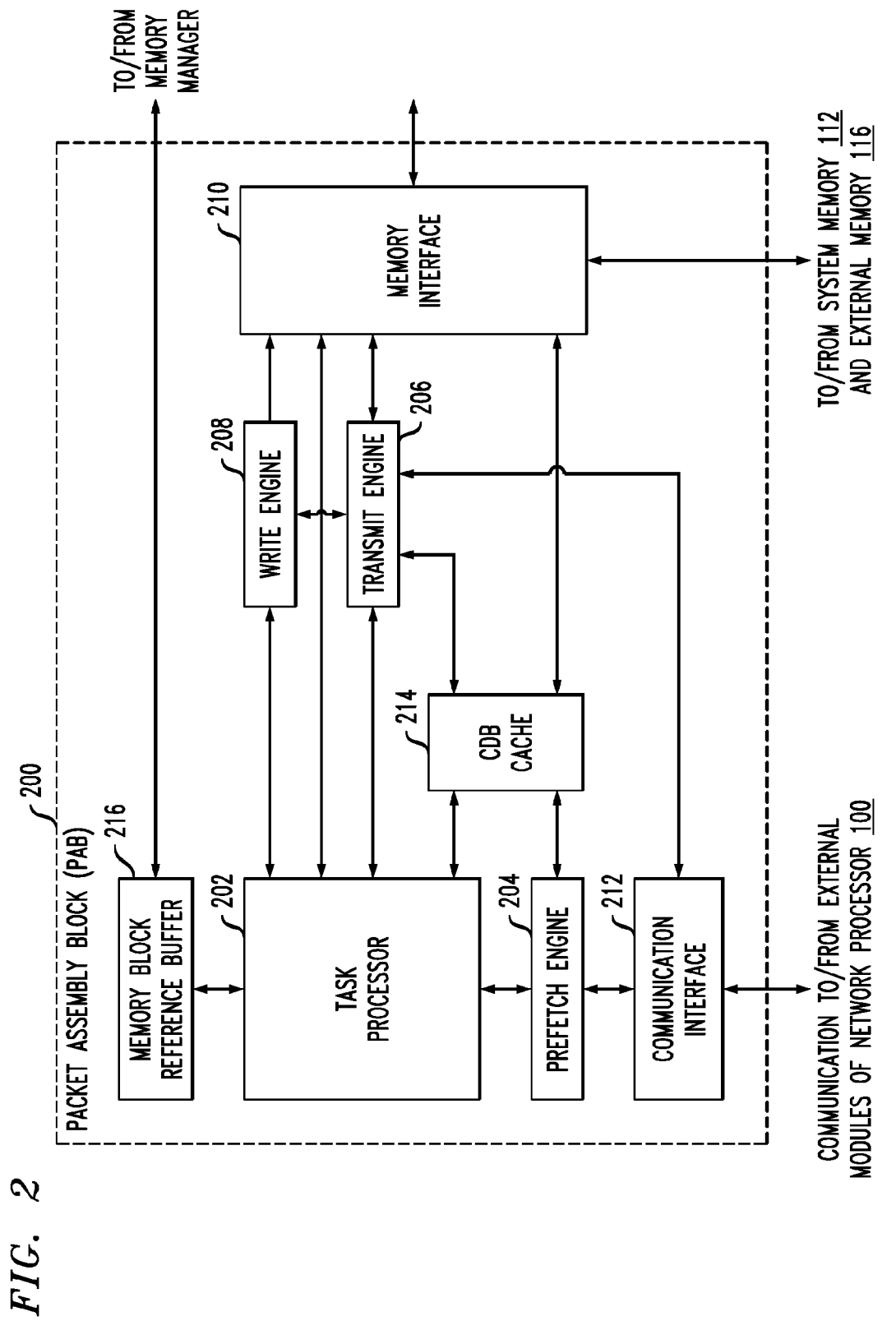
FIG. 2 shows a block diagram of a packet assembly submodule of the network processor of FIG. 1.

FIG. 2 shows a block diagram of an exemplary packet assembly block (PAB) 200, in accordance with embodiments of the present invention. As shown in FIG. 2, PAB 200 includes communication interface 212 that is in communication with one or more modules of network processor 100, for example, the various μP cores 106 and hardware accelerators 108. PAB 200 might typically receive requests to assemble and transmit data packets ("reassemblies") from a requesting module of network processor 100 through a communication ring of network processor 100 coupled to communication interface 212, such as described in related U.S. patent application Ser. Nos. 12/782,379, 12/782,393, and 12/782,411, all filed May 18, 2010. Thus, PAB 200 might typically receive tasks from other modules of network processor 100. As shown in FIG. 2, PAB 200 might also include memory interface 210. Memory interface 210 might be employed to provide synchronization for read/write coherency to system memory 112 and/or external memory 116. Memory interface 210 might typically write to system memory 112 in memory words that are a maximum number of bytes that can be transferred to system memory 112 in a single clock cycle.

The tasks received by PAB 200 might contain commands, data or pointers that specify how a reassembly corresponding to the task should be generated. Typical tasks indicate the reassembly operation associated with the task, for example, enqueue, transmit or discard operations. A given task might indicate multiple operations, for example, enqueue with transmit. Enqueue operations indicate that data corresponding to the task is to be added to the indicated reassembly. Transmit operations indicate that the indicated reassembly is to be transmitted as an output packet. Discard operations might deallocate a reassembly, for example, after the reassembly has been transmitted as an output task from PAB 200. A discard operation typically removes data from the start of a given reassembly to a specified point of the reassembly. If the specified point is the end of the reassembly, all the data of the reassembly is deleted, and the reassembly is deallocated.

Received tasks might be stored one or more task input queues (not shown) of communication interface 212. In some embodiments, communication interface 212 might include two input queues. The first input queue might be employed to queue high priority tasks and the second input queue might be employed to queue low priority tasks. Tasks for a given input queue are processed in order. A task might also include a reassembly index to allow PAB 200 to identify the reassembly to which a given task corresponds. The reassembly index is a unique identifier assigned to each reassembly. A particular index might be reused by PAB 200, for example, once all the reassembly data is sent to another processing module of network processor 100 (e.g., after a discard with deallocate operation).

PAB 200 might typically operate simultaneously on a large number of simultaneous reassemblies. In some embodiments, PAB 200 might support up to $2^{24}$ simultaneous reassemblies. PAB 200 might store the reassemblies in at least one of system memory 112 and external memory 116 during the assembly process, for example, by way of memory interface 210. PAB 200 might request dynamic allocations of one or more memory blocks from the MMB to store packet data of active reassemblies. The MMB might allocate one or more memory blocks to PAB 200 to store, for example, state data for each reassembly ("per-reassembly state data") in a Connection Database (CDB). The CDB might be stored in, for example, at least one of system memory 112 and external memory 116. In described embodiments, the MMB might statically allocate a fixed number of memory blocks for the CDB at startup of network processor 100. As shown in FIG. 3, system memory 112 might include CDB 302, which, for some embodiments, is an area of system memory 112 that is logically distinct from other areas of system memory 112, such as packet data memory 304.

PAB 200 retrieves per-reassembly state data from CDB 302 for the reassembly corresponding to the received input task. Upon receiving an input task, communication interface 212 indicates to task processor 202 that a new task is available. This indication might include various control fields of the task, for example, a task identifier (task ID) of the received task. Task processor 202 might employ the task ID to read any enqueue data corresponding to the task that might be stored in system memory 112.

For tasks associated with enqueue operations, PAB 200 retrieves the enqueue data from the received task and writes the enqueue data to the corresponding reassembly. The task might include the enqueue data inline within the task, or the task might include a pointer to the enqueue data in memory, for example shared memory 112. Based on the enqueue data, PAB 200 might start a new reassembly, append the enqueue data to the end of an existing reassembly, or write the enqueue data to a given offset within an existing reassembly. In some embodiments, PAB 200 might generally support a maximum reassembly size of 64 KB, less a predetermined number of bytes for control data.

For tasks associated with transmit operations, PAB 200 creates an output task with data from the reassembly corresponding to the received task. The output task might include inline data for small reassemblies, or pointers to locations in memory (e.g., memory 112) for larger reassemblies. PAB 200 might transmit reassembly data from the start of a reassembly, or from any arbitrary offset within the reassembly as specified by the received task. Communication interface 212 creates output tasks based on information provided by transmit engine 206. Once the output task is created, communication interface 212 sends the new output task to one or more of the processing modules of network processor 100.

For tasks associated with discard operations (for example, in conjunction with other operations such as transmit), PAB 200 might discard some or all of the reassembly data. For example, after a reassembly is transmitted as an output packet, the reassembly data might no longer be needed, and can be discarded. A discard operation begins from the start of an existing reassembly, and discards data for a specified length from the reassembly. As a result of a discard operation, whether all or only some of the reassembly data is discarded, PAB 200 updates the corresponding per-reassembly state to reflect the removal of reassembly data due to the discard operation. For example, a given reassembly might be stored in one or more blocks of memory. In some described embodiments, a maximum memory block size might be 16 kB per block, thus, for reassemblies larger than the maximum memory block size, multiple blocks might be employed. As will be described, the per-reassembly state data might include one or more pointers to additional memory blocks of the reassembly. A partial discard might delete all of the reassembly data from one or more given memory blocks, but not all the memory blocks. Each memory block that has all of its data discarded is freed by PAB 200, even if all of the reassembly data is not discarded. For discard operations where all the data is discarded, the reassembly is deallocated and PAB 200 updates its per-reassembly state data to discard the reassembly, and frees the corresponding memory (e.g., memory 112) and reassembly identifier for reuse.

If memory available to PAB 200 for storing reassemblies reaches a minimum threshold, or the input task queue depth reaches a maximum threshold, PAB 200 might, based on the priority of a received task, drop the received reassembly. As described herein, communication interface 212 receives tasks from various processing modules of network processor 100. Communication interface 212 selects the next task for PAB 200 to process from one of the queues and passes the task to prefetch engine 204. Prefetch engine 204 receives task information from communication interface 212, and passes task information to task processor 202. Prefetch engine 204 prefetches per-reassembly state data from CDB cache 214 and enqueue data from communication interface 212.

Communication interface 212 might include two queues to store received tasks. As described herein, one queue might be a high priority queue and the other queue might be a low priority queue. Tasks from the low priority queue might be dropped by PAB 200 if the input task queue depth becomes too large. If the low-priority input queue depth exceeds a threshold, communication interface 212 might drop one or more low-priority tasks. As will be described, PAB 200 might implement a "head drop", such that when the input task queue depth exceeds a threshold, PAB 200 reads tasks from the head of the low-priority input queue and marks the reassemblies corresponding to the tasks as dropped, rather than executing the task commands. PAB 200 might remain in head drop mode until the low-priority input queue depth drops below the threshold.

As shown, PAB 200 might also include CDB cache 214, for caching per-reassembly state data from CDB 302 stored in at least one of system memory 112 and external memory 116. CDB cache 214 might be implemented as a Level 1 (L1) cache that holds per-reassembly state data for up to 32 reassemblies. The per-reassembly state data stored in CDB cache 214 might include control data for each reassembly, for example, each reassembly's active status, exception status, data pointers, length, etc. If a request is made for a reassembly that does not have its per-reassembly state data stored in CDB cache 214, the requested per-reassembly state data is retrieved from system memory (e.g., memory 112) and is stored to an entry of CDB cache 214. CDB cache 214 might write cached per-reassembly state data back to system memory (e.g., CDB 302) when a cache location must be reused and the state data has been modified. PAB 200 maintains reassembly data coherency by allowing only one active task per reassembly, to avoid multiple tasks referencing the same reassembly. CDB cache 214 might track whether a particular cache entry is presently in use by PAB 200, such that active CDB cache entries cannot be reused for other reassemblies until they are no longer in use by PAB 200.

Task processor 202 performs command-specific functions related to the input task. For each received task, task processor 202 receives the corresponding task parameters and corresponding prefetched CDB information and enqueue data (if any) from prefetch engine 204. For enqueue operations, task processor 202 communicates with write engine 208 to add enqueue data to a reassembly. For transmit operations, task processor 202 sends control information and reassembly data to transmit engine 206 to create an output task. For discard operations, task processor 202 updates the corresponding per-reassembly state to reflect the removal of reassembly data due to the discard operation. Task processor 202 typically ends the execution of a state-modifying command by updating the per-reassembly state data stored in CDB Cache 214.

Write engine 208 receives enqueue data and per-reassembly state data from task processor 202. Write engine 208 writes the received data to a corresponding reassembly specified by task processor 202. If the task requires a transmit operation, write engine 208 might provide enqueue data to transmit engine 206 to generate a corresponding output task. Transmit engine 206 receives transmit operations from task processor 202. For transmit operations, transmit engine 206 retrieves information required to create the corresponding output task, for example from CDB cache 214, system memory 112 or communication interface 212, and provides the output task to communication interface 212 for transmission to other processing modules of network processor 100.

As described herein, PAB 200 generates reassemblies based on data packets received by network processor 100. A reassembly is generated based on one or more of the received data packets and might be sent as an output data packet of network processor 100 to one or more destination devices. As described, network processor 100 might generate one or more tasks corresponding to a received data packet, where the tasks are employed to communicate between the one or more processing modules of network processor 100.

As described, PAB 200 might maintain per-reassembly state data, shown in FIG. 4 as per-reassembly state data 400. As shown in FIG. 4, per-reassembly state data 400 might include data and control information, to process each reassembly. For example, each per-reassembly state might include control data field 402, internal data cache (IDC) field 406 for caching at least a portion of the reassembly data, and IDC length field 404 to indicate the amount of data stored in IDC field 406. As shown, each per-reassembly state might be one or more memory words long (a memory word being the maximum data transferred between memory interface 210 and CDB cache 214 in a single clock cycle). The memory words might be less than or equal to the actual memory width of system memory 112. Embodiments of the present invention provide that PAB 200 supports caching reassembly data during accumulation into output packets in order to minimize system memory bandwidth requirements between system memory 112 and external memory 116 to improve the overall performance of network processor 100.

Embodiments of the present invention (1) reduce the number of read/write cycles to external memory 116, and therefore reduce the number of memory read/write setup cycles, and (2) maximize the number of valid data bytes for each memory write. Embodiments of the present invention might determine when to write data to external memory 116 based on information retrieved from an input task and from the corresponding per-reassembly state data. For example, a subset of enqueue data from one or more input tasks, corresponding to one or more received data packets, might be cached before writing the subset of data to external memory 116. As described, PAB 200 maintains control data for each reassembly that is not yet complete ("per-reassembly control data"). The per-reassembly control data might typically include i) the memory address of the corresponding reassembly data, if any, and ii) the amount of reassembly data stored (possibly zero). To support a large number of simultaneous reassemblies, PAB 200 desirably stores the associated per-reassembly control data in system memory 112, for example, in CDB 302.

As described, an input task to PAB 200 might typically contain: i) packet data or pointers to packet data stored in system memory 112, ii) a reassembly index indicating a reassembly corresponding to the task, to which the packet data is to be written, iii) an indication of the relative location within the corresponding reassembly where the input packet data is to be written, and iv) an indication if this is the last task for the corresponding reassembly. When PAB 200 receives an input task, the corresponding reassembly is selected based on the reassembly index included with the task. PAB 200 might read the per-reassembly control data corresponding to the reassembly index from CDB 302 or CDB cache 214 (if the reassembly index is present in the cache). PAB 200 might then write the packet data corresponding to the received task to the corresponding reassembly in system memory 112, for example in packet data memory 304. As described, embodiments of PAB 200 might maintain one or more additional fields within each per-reassembly state stored in CDB cache 214 and CDB 302. As shown in FIG. 4, these additional fields might be IDC field 406 and IDC length field 404 to indicate the amount of reassembly data held in the IDC.

As shown in FIG. 4, the maximum amount of data that may be held in IDC field 406 for a given reassembly is the IDC width, and the width of the interface to CDB cache 214 is the memory word width. Desirably, the IDC width is a multiple of the memory word width, for example, if the memory word width is 16 bytes and the IDC width is 64 bytes. As shown, the width of system memory 112 is desirably large enough to store an entire per-reassembly state, for example, per-reassembly control data 402, IDC length field 404 and IDC field 406.

Upon receiving a new task, PAB 200 might examine the corresponding data packet to determine a length of the data packet. PAB 200 might also determine a length of data currently held in the IDC for the reassembly corresponding to the data packet. If the length of the data packet, plus the length of the data in the IDC is less than or equal to the maximum IDC width, then the packet data might be written to the IDC field for the corresponding reassembly rather than to packet data memory 304 (e.g., system memory 112). Since the corresponding per-reassembly data is present in CDB cache 214, writing data to the corresponding IDC field does not necessarily require access cycles to external memory 116. If the length of the data packet, plus the length of the data in the IDC is greater than the maximum IDC width, or if the packet is the last packet for the corresponding reassembly, PAB 200 reads the data from the IDC field and writes the data read from the IDC plus the new packet data to system memory 112 (e.g., packet data memory 304).

The per-reassembly state data might be pre-fetched at the start of processing an input task. By the time PAB 200 is executing the task, PAB 200 has already retrieved the corresponding per-reassembly state data and can determine whether or not the data can be written to the IDC. If PAB 200 receives enqueue packet data to write to a given reassembly, PAB 200 writes the enqueue packet data to system memory 112, either in CDB 302 (e.g., in the IDC of the corresponding per-reassembly state), or to packet data memory 304. The memory word containing the corresponding CDB entry is stored in system memory 112, because PAB 200 has already fetched the corresponding per-reassembly state for the reassembly. Thus, by pre-fetching the per-reassembly state to CDB 302 when an input task is received, PAB 200 is less likely to require accesses to external memory 116, because the per-reassembly state data, including IDC field 406, is already stored in system memory 112 because PAB 200 has read that information to process the packet corresponding to the one or more input tasks.

As described herein, the per-reassembly state, and therefore the corresponding IDC data, for an active reassembly are already stored in CDB cache 214 since PAB 200 pre-fetches the per-reassembly state data when an input task is received, and the IDC is stored with the per-reassembly control information. A write to packet data memory 304 is performed as a contiguous sequence of write cycles, each of which might be the maximum system memory width, except for possibly the last cycle if the total reassembly length is not an exact multiple of the system memory width. In this manner embodiments of the invention might reduce the number of memory setup cycles and increase utilization of the memory interface by using the full memory interface width for each write cycle to external memory 116.

FIG. 5 shows a table of exemplary memory operations of PAB 200. As shown in FIG. 5, the number of memory interface cycles to external memory 116 required for a given sequence of input packets corresponding to the same reassembly might be reduced by utilizing the IDC field of the per-reassembly state data, as described herein. As shown in FIG. 5, the system memory width is greater than or equal to 80 bytes and the IDC memory word width is 16 bytes. The exemplary case shown in FIG. 5 assumes that the per-reassembly state data, including IDC field 406, is already stored in system memory 112 because PAB 200 pre-fetches that information when each input task is received.

As shown for the exemplary case of FIG. 5, four packets are received (at relative times 0, 1, 2 and 3), each packet including 16 bytes of data to be written to the reassembly. As shown, PAB 200 writes the 16 bytes of data for each to the IDC field of the corresponding per-reassembly state. Writing to the IDC field does not require any access to external memory 116, as the IDC field is stored in system memory 112. In an exemplary embodiment of the present invention, the granularity of system memory 116 is 256 bytes. When PAB 200 reads per-reassembly state data there will be a read of the corresponding 256-byte line from external memory 116 which will be stored in the per-reassembly state data in system memory 112. This 256-byte system cache line is desirably large enough to hold the read per-reassembly control data and up to 80 bytes of packet data if necessary (e.g., the IDC).

When a final input packet having 16 bytes of data is received, or the IDC becomes full beyond a threshold, PAB 200 might read the IDC field, append the newly received packet data to the IDC field data, and write the packet data to system memory 112, for example in CDB portion 302. As shown, in FIG. 5, PAB 200 reads the 64 bytes received for 4 prior packets from system memory 112, appends 16 bytes of data from the fifth packet, and writes the entire packet data to at least one of system memory 112 and external memory 116. Thus, as shown, the first four write operations write reassembly data to CDB portion 302 of system memory 112, while, for the fifth packet, the 64 bytes for the first four packets are read from CDB portion 302 and then written out, along with the 16 bytes for the fifth packet, to packet memory portion 304 of system memory 112. This write to system memory 112 might require a write to external memory 116, which is performed in a single 80 byte write operation. As shown, the IDC full threshold might by 80 bytes, and the operation requires only one memory setup cycle and one memory write cycle, as the system memory width is greater than or equal to 80 bytes.

Without storing the packet data to the IDC field of the per-reassembly state data, each of the five exemplary packets shown in FIG. 5 would have a corresponding memory setup and memory write cycle to system memory. Thus, for the described example, rather than grouping five small packets into a single larger write operation to take advantage of the system memory width and to minimize memory setup cycles, the packet data would be written in five memory setup cycles and five memory write cycles, each memory write cycle using only a portion of the total system memory width.

For some embodiments of the present invention, only some of per-reassembly control data 402 might be necessary for some processes. To reduce the amount of reassembly data read from system memory 112 (e.g., CDB 302), PAB 200 might organize per-reassembly control data 402 into two segments: required control data and supplemental control data. The required control data and supplemental control data might be stored in separate memory words of per-reassembly state data 400, allowing fewer memory words to be read from system memory 112 if only required control data is desired. The supplemental control data might be read subsequently. In an exemplary embodiment, required control data that is generally needed for all operations of PAB 200 might be stored in a single memory word of per-reassembly state data 400, while supplemental control data that is optionally needed might be stored in two additional memory words of per-reassembly state data 400.

Included in per-reassembly control data might be one or more pointers to memory addresses in system memory 112 where data corresponding to the reassembly is stored. In some embodiments of the present invention, the required control data might include a newest pointer where data for the reassembly was most recently written, while any older pointers might be included in the supplemental control data. Thus, PAB 200 might determine whether or not the additional pointers included in the supplemental control data are needed to perform the operation corresponding to a received task. For example, if the operation appends the input packet data to the end of the reassembly, PAB 200 only reads the newest pointer from the required control data, because the newest pointer corresponds to the memory location of the end of the reassembly. Alternatively, if the operation writes the input packet data to an offset in the reassembly other than appending the data to the end of the reassembly, then PAB 200 reads the additional pointers to locate the memory location including the desired offset. Similarly, if the operation appends the input packet data to the end of the reassembly, but PAB 200 detects that size of the memory block corresponding to the newest pointer will be exceeded, PAB 200 reads the additional pointers from the supplemental control data, writes the input packet data to one or more memory blocks, and PAB 200 updates the pointer stored in the required control data to reflect the new memory block corresponding to the end of the reassembly. PAB 200 might store the one or more pointers in the supplemental control data in a constant relative order to maintain the pointers in order from newest to oldest within the per-reassembly state.

PAB 200 might typically have memory access activity that varies depending on the type of input packet operations being performed. If PAB 200 supports features, such as integrity checking, that might be enabled or disabled on a per-packet basis, accesses to system memory 112 might vary for each packet depending on whether a feature is enabled. In an exemplary case, PAB 200 might perform integrity checking operations on received packet data. Thus, some control data in per-reassembly state data 400 corresponding to the data packet might only be required by PAB 200 to perform the integrity checking operation. Thus, for any packets that do not require integrity checking, PAB 200 would read the required control data, but would not read the supplemental control data. For example, this could result in PAB 200 reading 2 fewer memory words of control data for packets not requiring integrity checking. The exact savings of memory interface bandwidth might depend on the size of the control data in the per-reassembly state, and the conditions under which PAB 200 does not need to read the supplemental per-reassembly state memory words.

In some instances, PAB 200 might not be able to process all of the input packets at the rate the input packets are received by network processor 100, for example, due to the input to network processor 100 being bursty. In such a situation, PAB 200 might not be able to completely accumulate and transmit each reassembly, because, if PAB 200 cannot process input packets at the rate the packets are received, some input packets might be dropped and not written to the specified reassembly. When one or more input packets for a given reassembly are dropped, the reassembly is considered corrupted, because the reassembly does not include complete packet data. Some described embodiments of PAB 200 avoid transmitting corrupted data packets, instead indicating in the output packet that the reassembly has been corrupted.

In general, PAB 200 requires some finite amount of time to process a particular input packet, for example, to read packet data from system memory 112 or to write new packet data to system memory 112. While PAB 200 is processing a given input packet, additional input packets might be received by network processor 100. Typically, PAB 200 might employ an input queue to temporarily store input packet data while PAB 200 is processing an older input packet. If the rate at which input packets are received is greater than the rate at which PAB 200 processes the input packets, the input queue might become full and, thus, be unable to store any additional input packets. When the input queue is full, PAB 200 might drop one or more input packets (i.e., enter a "drop mode").

Described embodiments of PAB 200 detect when the input queue reaches a threshold indicating the maximum allowed queue depth, but before the input queue is entirely full. When the maximum allowed queue depth is reached, PAB 200 might enter drop mode. In embodiments of the present invention, the maximum queue depth might be implemented such that PAB 200 begins corrective action when the queue depth exceeds a first threshold, and continues until the queue depth drops below a second threshold. In embodiments of the present invention, the second threshold might be smaller than the first threshold.

To process a packet, PAB 200 reads the corresponding per-reassembly state data from CDB 302, performs some processing on the reassembly data (such as appending new packet data to the reassembly data), and writes updated per-reassembly state data to CDB 302. For example, PAB 200 might take 1 clock cycle to read the per-reassembly state data from CDB 302, and 1 clock cycle to write the updated per-reassembly state data to CDB 302. The amount of time to read/write packet data from/to system memory might typically be proportional to the amount of packet data. For example, if it takes 1 clock cycle to read/write one byte, PAB 200 might take 10 clock cycles to process an 8 byte packet during normal operation. In described embodiments, when PAB 200 enters drop mode, PAB 200 might skip the step of reading/writing packet data from/to CDB 302, thus processing an 8-byte packet in 2 clock cycles when in drop mode. Therefore, PAB 200 might empty the input queue below the queue depth threshold if the drop mode processing is faster than the arrival rate of new packets to network processor 100.

As described herein, PAB 200 maintains information for each reassembly that is not yet complete, shown in FIG. 4 as per-reassembly state data 400. As described herein, per-reassembly control data 402 might be split into required control data and supplemental control data. Required control data might typically include: i) the location(s) in system memory 112 of the corresponding reassembly data, and ii) the amount of reassembly data stored (possibly zero). As part of normal input packet processing, PAB 200 might typically read the per-reassembly state data from CDB 302, calculate updated values for the state data as part of processing the input packet, and write the updated per-reassembly state data to CDB 302.

FIG. 6 shows a flow diagram of process 600 performed by PAB 200 when an input packet is received. As shown in FIG. 6, at step 602, PAB 200 begins processing for a received input packet. At step 604, the packet is added to the input queue of PAB 200. At step 606, PAB 200 might read the packet from the input queue, and check the depth of the input queue versus the maximum allowed queue depth threshold. If the input queue depth exceeds the maximum allowed queue depth threshold, PAB 200 might enter drop mode at step 608. PAB 200 might stay in drop mode until the input queue reaches a predetermined queue depth at step 610. Drop mode will be described in greater detail in regard to FIG. 7. If the input queue depth does not exceed the maximum allowed queue depth threshold, PAB 200 might process the oldest packet in the input queue in normal mode at step 612. At step 614, if the input queue is not empty, PAB 200 might return to step 612 to process the next oldest packet in the input queue. At step 614, if the input queue is empty, PAB 200 is idle at step 616 until a new input packet is received.

FIG. 7 shows a flow diagram of drop mode, entered at step 608 of FIG. 6. As shown in FIG. 7, PAB 200 enters drop mode at step 702. At step 704, PAB 200 removes a packet from the input queue. For example, PAB 200 might typically remove the oldest packet from the input queue. Instead of performing normal processing for the packet (e.g., writing the packet data to the corresponding reassembly, or transmitting the corresponding reassembly), PAB 200 drops the packet and removes it from the input queue. As described, in drop mode, PAB 200 might read the per-reassembly state data from CDB 302 and, at step 706, set the drop indicator of the reassembly corresponding to the dropped packet and update the per-reassembly state data to CDB 302. By setting a drop indicator, PAB 200 might track corrupted reassemblies. As described, drop mode processing is faster than normal mode processing because PAB 200 does not write packet data of the dropped packets to the corresponding reassembly, allowing the input queue to be emptied at a faster rate than in normal mode.

As described, PAB 200 maintains a drop indicator in each per-reassembly state, recording the fact that the reassembly has been corrupted due to one or more dropped packets. If the dropped input packet corresponded to an enqueue operation, the packet data was not written to the corresponding reassembly, resulting in a corrupt reassembly. If the dropped input packet corresponded to a transmit packet, the corresponding reassembly was not transmitted, and retains the "old" reassembly data, resulting in a corrupt reassembly. The corresponding drop indicator is set when a packet is dropped, and remains set until the corresponding reassembly is no longer in use (e.g., PAB 200 has discarded the reassembly and deallocated the reassembly index).

While processing input packets in normal mode, PAB 200 reads an input packet from the input queue, reads the corresponding per-reassembly state data and performs the operation specified by the packet (e.g., enqueue, transmit). Before performing the operation, PAB 200 might check the drop indicator for the reassembly. If the drop indicator is set, for an enqueue packet, PAB 200 might discard the data as if PAB 200 were in drop mode, and for a transmit packet, PAB 200 might send an output packet with no data that includes an indication that the reassembly data is corrupted. Thus, a destination device receiving packets from network processor 100 might receive an indication that the packet is corrupted.

System memory 112 might typically be divided into small blocks of memory that are available to be allocated to the various processing modules of network processor 100, on an as needed basis. Network processor 100 might employ a memory management module, for example a memory management block (MMB) to allocate and deallocate the memory blocks. Network processor 100 might employ an MMB substantially as described in related U.S. patent application Ser. No. 12/963,895, filed on Dec. 9, 2010.

As described herein, embodiments of PAB 200 might include memory block reference buffer 216, as shown in FIG. 2. Memory block reference buffer 216 might maintain a small number of memory block addresses that are allocated by the MMB for use by PAB 200. As PAB 200 processes input packets, PAB 200 might request memory blocks from the MMB. Temporary situations might occur where the MMB is unable to allocate a memory block in response to a given request, for example, when all of system memory 112 is in use. If PAB 200 requests a memory block and the MMB cannot allocate a memory block, PAB 200 might be unable to store reassembly data, which might result in one or more corrupted output packets.

Memory block reference buffer 216 might request one or more memory blocks from the MMB. The MMB might typically respond with an indication whether a memory block is allocated and, if one or more memory blocks are allocated, the response includes the addresses of the one or more memory blocks. Memory block reference buffer 216 might maintain a number of memory block addresses that are "pre-allocated" to PAB 200 by the MMB, such that task processor 202 might request one or more memory blocks from memory block reference buffer 216 rather than requesting the one or more memory blocks directly from the MMB. A request to memory block reference buffer 216 might be via a low-latency dedicated interface between task processor 202 and memory block reference buffer 216. When memory block reference buffer 216 provides a memory block address to task processor 202, memory block reference buffer 216 might typically request one or more blocks from the MMB such that memory block reference buffer 216 is generally "full".

As shown in FIG. 8, in described embodiments, PAB 200 might request memory blocks from one of memory block reference buffer 216 and the MMB by employing memory block request process 800. As shown in FIG. 8, at step 802, task processor 202 requests one or more memory blocks from memory block reference buffer 216. At step 804, if memory block reference buffer 216 has one or more free memory addresses available, at step 806, memory block reference buffer 216 provides the memory block addresses to task processor 202 for use. At step 804, if memory block reference buffer 216 does not have free memory addresses available to fulfill the request received at step 802, then, at step 808, memory block reference buffer 216 requests one or more memory blocks be allocated by the MMB.

At step 810, if the MMB fulfills the request and allocates one or more memory blocks to memory block reference buffer 216, then at step 816, memory block reference buffer 216 clears the request failed indication. As indicated by the dashed lines, step 816 is optionally performed if the request failed indication was set. At step 818, memory block reference buffer 216 provides the address of an allocated memory block to task processor 202. As indicated by the dashed lines, step 818 is optionally performed. For example, if the request received at step 802 is already fulfilled, but memory block reference buffer 216 is requesting additional memory blocks such that memory block reference buffer 216 is full, then memory block reference buffer 216 does not provide the memory block address to task processor 202 until a corresponding request is received, such as at step 802. At step 820, if memory block reference buffer 216 is full, then at step 822, memory request operation 800 is complete. If, at step 820, memory block reference buffer 216 is not full, processing returns to step 808 for memory block reference buffer 216 to request one or more additional memory blocks from the MMB.

At step 810, if the MMB is unable to fulfill the request, for example if there are no memory blocks available for allocation, then at step 812, memory block reference buffer 216 sets a failed request indicator and, at step 814, memory block reference buffer 216 waits until a subsequent memory block request is received from task processor 202 before resending the memory block request to the MMB. For example, in parallel, task processor is requesting blocks from memory block reference buffer 216, and memory block reference buffer 216 is requesting memory blocks from the MMB. With this approach, memory block reference buffer 216 is always one of the following: (i) full; (ii) non-full and has an outstanding request to the MMB; or (iii) non-full, has no outstanding requests to the MMB, and the failed request indicator is set.

For example, embodiments of memory block reference buffer 216 might store up to 8 memory block addresses. If the MMB provides a memory block when requested (e.g., step 810 is successful), memory block reference buffer 216 will have 8 memory addresses available to provide to task processor 202. If task processor 202 requests a memory block (e.g., step 802), memory block reference buffer 216 provides a memory address (e.g., step 806), reducing the available number of memory addresses to 7. Memory block reference buffer 216 then requests a new memory block from the MMB (e.g., step 808). If the MMB is able to provide a new block, the block address is added to memory block reference buffer 216, restoring the number of available memory addresses to 8. If the MMB is unable to provide a new block, memory block reference buffer 216 will have only 7 memory addresses available, and memory block reference buffer 216 sets a request failed indicator (e.g., step 812) and does not request additional blocks from the MMB until task processor 202 makes a subsequent memory request (e.g., step 802). Thus, as described, PAB 200 might reduce the number of memory requests made to the MMB while the MMB is unable to provide a memory block. For example, the chance of a memory request from PAB 200 causing contention delays to the MMB processing memory requests from another processing module of network processor 100 is reduced.

As described herein, PAB 200 might store reassembly data in memory blocks that are allocated dynamically from the MMB. When the reassembly is transmitted and PAB 200 no longer needs to retain the reassembly data, PAB 200 deallocates the memory block(s) to make the block(s) available for reuse. In order to deallocate a memory block, PAB 200 provides the MMB with the address of the memory block(s) to be deallocated. It is possible that due to detected packet errors or an unavailability of system memory, that PAB 200 might determine, prior to transmission of the reassembly, that the reassembly data should be discarded ("early termination"). When an early termination event occurs, PAB 200 would desirably deallocate the corresponding memory blocks in a short amount of time, even if PAB 200 does not have access to the corresponding memory block addresses at the time the early termination event occurs (e.g., if the memory block addresses are stored in the supplemental portion of the per-reassembly state data).

Embodiments of the present invention might provide a guarantee of bounded latency on memory block deallocation by inserting a pseudo input packet (an "Internal Cleanup" packet, or "IC" packet) into the stream of input packets received by PAB 200. PAB 200 might insert an IC packet when an early termination event occurs, the terminated reassembly has corresponding memory blocks to deallocate, and the corresponding supplemental per-reassembly state data was not retrieved from system memory 112, and, thus, is not available in CDB cache 214. PAB 200 might set an indicator in the corresponding per-reassembly state data indicating termination of the corresponding reassembly (e.g., an "early termination" indicator).

The IC packet includes a unique identifier for task processor 202 to distinguish the IC packet from normal input packets. Upon receiving a normal input packet, PAB 200 might determine whether the received input packet requires PAB 200 to read all of the corresponding per-reassembly state data, or only a subset of the corresponding per-reassembly state data. For example, input packets that correspond to a transmit operation might indicate that PAB 200 is finished with the reassembly data after the transmit operation is complete. For such an input packet, PAB 200 might read all of the corresponding per-reassembly state data, for example, the per-reassembly data including the addresses of any allocated memory blocks used by the reassembly, such that PAB 200 might deallocate the memory blocks used by the reassembly once the reassembly is transmitted.

Other types of input packets might not require PAB 200 to read all of the corresponding per-reassembly state data. For example, PAB 200 might not read the supplemental per-reassembly data including the addresses of any allocated memory blocks used by the reassembly for all input packets. If an exception condition later occurs for an input packet for which PAB 200 did not read all the corresponding per-reassembly state data, PAB 200 might be temporarily unable to deallocate the corresponding memory blocks since PAB 200 did not read the addresses of all of the allocated memory blocks. When an exception condition occurs, PAB 200 might set the early termination indicator of the corresponding per-reassembly data. Embodiments of PAB 200 might insert an IC packet for a given reassembly into the packet input stream, such that PAB 200 will read the corresponding per-reassembly data, including the addresses of allocated memory blocks, for the reassembly corresponding to the IC packet. For example, an IC packet might be inserted when an early termination event occurs, the terminated reassembly has corresponding memory blocks to deallocate, and the corresponding supplemental per-reassembly state data was not retrieved from system memory 112, and, thus, is not available in CDB cache 214. Thus, PAB 200 might deallocate, within a predetermined maximum amount of time, memory blocks associated with reassemblies having the corresponding early termination indicator set.

In some cases, PAB 200 might receive, between the time that the early termination condition is detected and the time when the IC packet is inserted into the input stream, an input packet for a new reassembly that is reusing a reassembly index value that would have been deallocated except for the occurrence of the early termination. Upon receiving the packet for the new reassembly, PAB 200 might read a subset of the per-reassembly state data for the corresponding reassembly index. The subset of per-reassembly state data includes the early termination indicator. If PAB 200 detects that the early termination indicator corresponding to the reassembly index is set, PAB 200 might deallocate the memory blocks corresponding to the reassembly index, clear the early termination indicator, and process the newly received packet as normal. Upon receiving an IC packet for the corresponding reassembly index, PAB 200 might read the early termination indicator, determine that the early termination indicator is not set, and ignore the IC packet.

Described embodiments of PAB 200, upon experiencing an exception condition, either discard the partial/corrupted packet data from the corresponding reassembly, or transmit whole correct reassemblies, rather than transmitting incorrect reassemblies. When an exception occurs that requires one or more packets to be discarded, PAB 200 might prevent subsequent packets that do not experience exceptions from being unnecessarily corrupted or discarded.

PAB 200 might include an active indicator and an exception indicator in the per-reassembly state data for each reassembly. The active indicator, when set, indicates that the reassembly currently contains data. The exception indicator, when cleared, indicates that the reassembly has not experienced an exception condition since the reassembly index was allocated. Any input packets corresponding to a reassembly that has the exception indicator cleared is processed as normal by PAB 200.

When the active indicator is set and a new enqueue input packet is received referencing the corresponding reassembly index, the data of the input packet is added to the reassembly if the exception indicator is cleared. If the exception indicator is set, an exception condition has occurred and the data of the input packet is not added to the reassembly. PAB 200 might generate an interrupt to one or more other processing modules of network processor 100 to indicate an exception condition has occurred. When the active indicator is set and a new transmit input packet is received referencing the corresponding reassembly index, the data of the reassembly is transmitted as an output packet if the exception indicator is cleared. If the exception indicator is set, an exception condition has occurred and the reassembly is not transmitted as an output packet. If the transmit packet indicated that the reassembly could be deallocated once the entire reassembly data is discarded, PAB 200 clears the corresponding active indicator. PAB 200 might generate an interrupt to one or more other processing modules of network processor 100 to indicate an exception condition has occurred.

When the active indicator is cleared, the last received input packet for this reassembly index indicated that the reassembly was finished and the memory blocks could be deallocated. When the active indicator is cleared and a new enqueue input packet is received, the data is added to the corresponding reassembly, and the active indicator is set. If this input packet experienced an exception condition, the exception indicator is set, and the data is not added to the reassembly. When the active indicator is cleared and a new transmit input packet is received, PAB 200 takes no action, as the reassembly is already inactive.

When PAB 200 detects an exception while processing a task for a given reassembly, PAB 200 notifies one of the various μP cores 106 and hardware accelerators 108 of network processor 100, for example the corresponding core or accelerator that provided the input packet to PAB 200. The corresponding core or accelerator might determine whether a partial reassembly exists corresponding to the reassembly index value of the exception condition. If a partial reassembly exists, PAB 200 discards any remaining packets sent to that reassembly, until a discard packet is received that indicates the reassembly is complete and can be deallocated. When the corresponding core or accelerator receives the exception notification from PAB 200, the core or accelerator inserts a packet into the input stream that indicates that the corresponding reassembly is complete and might be deallocated without transmitting the reassembly data if a partial reassembly existed. Inserting the packet into the input stream to indicate that the reassembly is complete assures that PAB 200 clears the per-reassembly state data for that reassembly, so that the reassembly index may be used for a subsequent set of input packets.

For example, Table 2 shows an exemplary sequence of input packets referring to a single reassembly index:

TABLE 2

| Input Packets |
| --- |
| Enqueue A |
| Enqueue B |
| Enqueue C |
| Transmit ABC (done) |
| Enqueue D |
| Enqueue E |
| Enqueue F |
| Transmit DEF (done) |
| Enqueue G |
| Enqueue H |
| Enqueue I |
| Transmit GHI (done) |

For the exemplary input packet sequence shown in Table 2, if the "Enqueue B" input packet experienced an exception condition, and at the time software received the notice of the exception the Enqueue G packet had been sent but the Enqueue H had not yet been sent, the corresponding one of the various μP cores 106 and hardware accelerators 108 of network processor 100 causes the Enqueue H, Enqueue I and Transmit GHI packets not to be sent to PAB 200, and instead inserts a "Done" packet into the input stream. While processing the Enqueue B packet, PAB 200 sets the exception indicator in the corresponding per-reassembly state data. When PAB 200 receives the Enqueue C packet, PAB 200 does not change the per-reassembly state data for the reassembly index corresponding to ABC, and does not write the input packet data to the reassembly.

When PAB 200 receives the subsequent Transmit ABC (done) packet, PAB 200 does not send an output packet because the exception indicator is set, and instead clears the active indicator in the per-reassembly state data. When PAB 200 receives the Enqueue D, E and F packets and the Transmit DEF (done) packets, PAB 200 processes them normally and sends the reassembly data as an output packet (DEF). When PAB 200 receives the Enqueue G packet, PAB 200 processes the packet normally. Then, PAB 200 receives the "Done" packet inserted by the corresponding one of the various μP cores 106 and hardware accelerators 108 of network processor 100 corresponding to the exception condition of the enqueue B packet, which causes PAB 200 to clear the active indicator of ABC and not to send an output task.

Thus, as described herein, packets ABC, DEF and GHI shown in Table 2 are referring to the same reassembly index. The Active bit is cleared by "Transmit ABC done", set by D, cleared by "Transmit DEF done", set again by G, and cleared by the "Done" packet inserted by the corresponding core or accelerator. Due to latency in the system, PAB 200 might not receive the "Done" indication until later in time, in this example shown as several packets later, after receiving the Enqueue G packet. As a result, in the exemplary case described above, PAB 200 sends only a complete DEF output packet. As described above, the corresponding core or accelerator, as a result of the exception indication received from PAB 200, does not send the Enqueue H or Enqueue I packets, so PAB 200 does not send a partial GHI output packet.

When an exception occurs, the reassembly corresponding to the input packet having the exception is marked as having an exception. This exception indication remains with the reassembly until it is completely terminated. Until that time, any packets that would normally have been transmitted by PAB 200 for that reassembly will not be transmitted, due to the reassembly's exception indicator being set. PAB 200 might notify the corresponding one of the various μP cores 106 and hardware accelerators 108 of network processor 100 that an exception has occurred, and the corresponding one of the various μP cores 106 and hardware accelerators 108 of network processor 100 might insert a "done" indication to ensure cleanup by PAB 200. Thus, no "short" (e.g., output packets missing data) or "long" (e.g., output packets including data from other reassemblies) output packets are sent from PAB 200.

Table 3 shows an exemplary input sequence and the corresponding output sequence of PAB 200. Column one of Table 3 indicates either the input packet that initially experiences an exception condition, or the last packet sent by the source core or accelerator before the exception notification was received from PAB 200:

TABLE 3

| Input Packet Experiencing an Exception | Output Packet Sequence |
|---|---|
| Enqueue A | DEF; GHI |
| Enqueue B | DEF; GHI |
| Enqueue C | DEF; GHI |
| Transmit (done) | DEF; GHI |
| Enqueue D | ABC; GHI |
| Enqueue E | ABC; GHI |
| Enqueue F | ABC; GHI |
| Transmit (done) | ABC; GHI |
| Enqueue G | ABC; DEF |
| Enqueue H | ABC; DEF |
| Enqueue I | ABC; DEF |
| Transmit (done) | ABC; DEF |

Thus, as described herein, embodiments of the present invention provide a packet assembler for a network processor. The network processor includes a plurality of processing modules for processing received packets into one or more processed-packet portions. A shared system memory of the network processor receives processed-packet portions corresponding to packet assemblies. Each of the packet assemblies has associated tasks. A packet assembly processor constructs an output packet for each packet assembly from the processed-packet portions in accordance with instructions from the tasks associated with the packet assembly. The packet assembly processor coordinates storage of the processed-packet portions for each output packet that is read from the shared memory based on the instructions from the tasks associated with the corresponding packet assembly.

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A packet assembler for a network processor implemented as a system-on-chip, the network processor processing received packets with a plurality of processing modules into one or more processed-packet portions, the network processor coupled to an external memory, the packet assembler comprising:
a shared on-chip system memory of the network processor, the system memory configured to receive one or more processed-packet portions corresponding to one or more packet assemblies, each of the packet assemblies having one or more associated tasks;
an input queue configured to receive the one or more associated tasks for the packet assemblies; and
a packet assembly processor configured to construct an output packet for each packet assembly from the one or more processed-packet portions in accordance with instructions from the one or more tasks associated with the packet assembly,
wherein the packet assembly processor is further configured to:
coordinate storage of the one or more processed-packet portions for each output packet that is read from the system memory based on the instructions from the one or more tasks associated with the corresponding packet assembly;
enter a drop mode upon detecting that the input queue depth has reached a threshold, wherein, in the drop mode, the packet assembly processor is configured to:
remove an oldest task from the input queue;
set a drop indication in a state data entry corresponding to the packet assembly associated with the removed task;

drop one or more subsequent tasks from the input queue, without processing the tasks, until the input queue depth is below the threshold;

set a drop indication in a state data entry corresponding to the packet assembly associated with the one or more dropped tasks;

remove the packet assembly having the drop indication set from the system memory without constructing an output packet, thereby avoiding transmitting corrupt output packets;

send an indicator to a destination device that a corresponding packet assembly was dropped; and when the input queue depth is below the threshold: exit the drop mode and process an oldest task in the input queue.

2. The packet assembler of claim 1, wherein the packet assembly processor is further configured to maintain a state data entry corresponding to each packet assembly, wherein the state data entry comprises control data and a cache of processed-packet data.

3. The packet assembler of claim 2, the packet assembly processor further configured to: determine a length of each received processed-packet portion;

determine a length of processed-packet data cached in the state data entry corresponding to the received processed-packet portion; and if a combination of the length of the received processed-packet portion and the length of processed-packet data in the cache reaches a threshold, then write the received processed-packet portion and the processed-packet data in the state data entry to the external memory of the network processor, otherwise, add the received processed-packet portion to the cache of processed-packet data.

4. The packet assembler of claim 3, wherein the threshold is equal to a word width of the system memory.

5. The packet assembler of claim 3, further comprising a local cache memory configured to store the state data entries for one or more most recently-accessed packet assemblies, wherein most recently refers to a relative order in which the packet assembler accesses the state data entries.

6. The packet assembler of claim 5, wherein the state data entry for each packet assembly is stored in the system memory.

7. The packet assembler of claim 2, wherein the control data for each state data entry corresponding to a packet assembly comprises:

required control data; and supplemental control data, wherein:

the required control data is a first subset of the control data employed by the packet assembly processor to execute the instructions from the one or more tasks associated with the packet assembly, and the supplemental control data is a second subset of the control data employed by the packet assembly processor to execute a subset of the instructions from the one or more tasks associated with the packet assembly.

8. The packet assembler of claim 7, wherein the packet assembly processor is further configured to:

determine a corresponding packet assembly of a received processed-packet portion;

determine whether the state data entry of the corresponding packet assembly is available in a local cache memory of the packet assembly processor; and if the state data entry of the corresponding packet assembly is unavailable in the local cache memory, read the required control data of the state data entry from the external memory and store the required control data in the local cache memory, wherein the supplemental control data is not read.

9. The packet assembler of claim 8, wherein the local cache memory is configured to store the control data for each state data entry and a data cache of packet data corresponding to each reassembly.

10. The packet assembler of claim 7, wherein the packet assembly processor is further configured to:

set an early termination indicator of the state data entry for a given packet assembly if an error condition occurs;

in response to an internal cleanup packet corresponding to a given packet assembly, read the required data and the supplemental data of the state data entry for the given packet assembly, and if the early termination indicator of the state data entry for the given packet assembly is set, deallocate one or more blocks of the system memory in use for the given packet assembly.

11. The packet assembler of claim 7, wherein the packet assembly processor is further configured to:

store a pointer to a memory location corresponding to the end of each packet assembly in the required control data for each state data entry; and store one or more pointers to other memory locations corresponding to each packet assembly in the supplemental control data for each state data entry.

12. The packet assembler of claim 11, wherein the packet assembly processor is further configured to maintain the one or more pointers in the supplemental control data in a constant relative order from oldest to newest.

13. The packet assembler of claim 1, further comprising a memory buffer configured to store one or more addresses of memory blocks in the system memory allocated to the packet assembler.

14. The packet assembler of claim 13, wherein the memory buffer is configured to request one or more memory blocks from the system memory in response to one or more of the received tasks.

15. The packet assembler of claim 13, wherein, if the system memory denies an allocate request for one or more memory blocks, the memory buffer is configured to wait for a subsequent task and re-submit a request for the one or more memory blocks from the system memory.

16. The packet assembler of claim 1, wherein each of the one or more associated tasks comprises:

an identifier corresponding to the packet assembly;

data corresponding to the processed-packet portion associated with the task; and an identifier of an operation on the packet assembly, wherein the data corresponding to the processed-packet portion is one of: (i) data of the processed-packet portion and (ii) a pointer to an address in the system memory where the data of the processed-packet portion is stored.

17. The packet assembler of claim 2, wherein the packet assembly processor is further configured to:

(i) maintain an active indicator and an exception indicator in the state data entry corresponding to each packet assembly, wherein the active indicator is set to indicate a currently active reassembly, and wherein the exception indicator is set to indicate the corresponding reassembly has experienced an exception condition; and (ii) detect an exception condition in a received packet, set the exception indicator in the corresponding state data entry, and transmit an exception notification to a source processing module of the plurality of processing modules of the network processor.

18. The packet assembler of claim 17, wherein:
the source processing module is configured to provide a pseudo packet to the packet assembler, wherein the pseudo packet indicates that the reassembly having the exception condition is complete, and the packet assembly processor is further configured to, responsive to the pseudo packet, deallocate the reassembly without transmitting a corresponding output packet.

19. A method of assembling output packets of a network processor implemented as a system-on-chip, the network processor processing received packets with a plurality of processing modules into one or more processed-packet portions, the network processor coupled to an external memory, the method comprising:
receiving, by a shared on-chip system memory of the network processor, one or more processed-packet portions corresponding to one or more packet assemblies, each of the packet assemblies having one or more associated tasks, the packet assembly processor comprising an input queue configured to receive the one or more associated tasks for the packet assemblies;
constructing, by a packet assembly processor, an output packet for each packet assembly from the one or more processed-packet portions in accordance with instructions from the one or more tasks associated with the packet assembly;
coordinating, by the packet assembly processor, storage of the one or more processed-packet portions for each output packet that is read from the system memory based on the instructions from the one or more tasks associated with the corresponding packet assembly;
entering a drop mode upon detecting that a depth of the input queue has reached a threshold, wherein the drop mode comprises:
removing an oldest task from the input queue;
setting a drop indication in a state data entry corresponding to the packet assembly associated with the removed task;
dropping one or more subsequent tasks from the input queue, without processing the tasks, until the input queue depth is below the threshold;
setting a drop indication in a state data entry corresponding to the packet assembly associated with the one or more dropped tasks;
removing the packet assembly having the drop indication set from the system memory without constructing an output packet, thereby avoiding transmitting corrupt output packets;
sending an indicator to a destination device that a corresponding packet assembly was dropped; and
when the input queue depth is below the threshold:
exiting the drop mode and processing an oldest task in the input queue.

20. The method of claim 19, further comprising:
maintaining, by the packet assembly processor, a state data entry corresponding to each packet assembly, wherein the state data entry comprises control data and a cache of processed-packet data.

21. The method of claim 20, further comprising:
by the packet assembly processor:
determining a length of each received processed-packet portion;
determining a length of processed-packet data cached in the state data entry corresponding to the received processed-packet portion; and if a combination of the length of the received processed-packet portion and the length of processed-packet data in the cache reaches a threshold:
writing the received processed-packet portion and the processed-packet data in the state data entry to the external memory,
otherwise:
adding the received processed-packet portion to the cache of processed-packet data.

22. The method of claim 21, wherein the threshold is equal to a word width of the system memory.

23. The method of claim 21, wherein the packet assembly processor further comprises a local cache memory configured to store the state data entries for one or more most recently-accessed packet assemblies, wherein most recently refers to a relative order in which the packet assembler accesses the state data entries.

24. The method of claim 22, wherein the state data entry for each packet assembly is stored in the system memory.

25. The method of claim 20, wherein the control data for each state data entry corresponding to a packet assembly comprises:
required control data; and
supplemental control data, wherein:
the required control data is a first subset of the control data employed by the packet assembly processor to execute the instructions from the one or more tasks associated with the packet assembly, and the supplemental control data is a second subset of the control data employed by the packet assembly processor to execute a subset of the instructions from the one or more tasks associated with the packet assembly.

26. The method of claim 25, further comprising:
by the packet assembly processor:
determining a corresponding packet assembly of a received processed-packet portion;
determining whether the state data entry of the corresponding packet assembly is available in a local cache memory of the packet assembly processor; and
if the state data entry of the corresponding packet assembly is unavailable in the local cache memory, reading the required control data of the state data entry from the system memory and storing the required control data in the local cache memory, wherein the supplemental control data is not read.

27. The method of claim 20, further comprising, storing, in a local cache memory, the control data for each state data entry and a data cache of packet data corresponding to each reassembly.

28. The method of claim 25, further comprising:
setting an early termination indicator of the state data entry for a given packet assembly if an error condition occurs;
in response to an internal cleanup packet corresponding to a given packet assembly, reading the required data and the supplemental data of the state data entry for the given packet assembly, and
if the early termination indicator of the state data entry for the given packet assembly is set, deallocating one or more blocks of the system memory in use for the given packet assembly.

29. The method of claim 25, further comprising:
storing a pointer to a memory location corresponding to the end of each packet assembly in the required control data for each state data entry; and
storing one or more pointers to other memory locations corresponding to each packet assembly in the supplemental control data for each state data entry.

30. The method of claim 29, further comprising:
maintaining the one or more pointers in the supplemental control data in order from oldest to newest.

31. The method of claim 19, wherein the packet assembly processor comprises a memory buffer configured to store one or more addresses of memory blocks in the system memory that are allocated to the packet assembler.

32. The method of claim 31, further comprising:
requesting, by the memory buffer, one or more memory blocks from the system memory in response to one or more of the received tasks.

33. The method of claim 32, further comprising:
if the system memory denies an allocate request for one or more memory blocks:
  waiting, by the memory buffer, for a subsequent task and re-submitting a request for the one or more memory blocks from the system memory.

34. The method of claim 19, wherein each of the one or more associated tasks comprises:
an identifier corresponding to the packet assembly;
data corresponding to the processed-packet portion associated with the task; and
an identifier of an operation on the packet assembly,
wherein the data corresponding to the processed-packet portion is one of: (i) data of the processed-packet portion and (ii) a pointer to an address in the system memory where the data of the processed-packet portion is stored.

35. The method of claim 20, wherein the packet assembly processor is further configured to:
(i) maintain an active indicator and an exception indicator in the state data entry corresponding to each packet assembly, wherein the active indicator is set to indicate a currently active reassembly, and wherein the exception indicator is set to indicate the corresponding reassembly has experienced an exception condition; and
(ii) detect an exception condition in a received packet, set the exception indicator in the corresponding state data entry, and transmit an exception notification to a source processing module of the plurality of processing modules of the network processor.

36. The method of claim 35, wherein:
the source processing module is configured to provide a pseudo packet to the packet assembler, wherein the pseudo packet indicates that the reassembly having the exception condition is complete, and the packet assembly processor is further configured to, responsive to the pseudo packet, deallocate the reassembly without transmitting a corresponding output packet.

37. A non-transitory machine-readable storage medium, having encoded thereon program code, wherein, when the program code is executed by a machine, the machine implements a method of assembling output packets of a network processor implemented as a system-on-chip, the network processor processing received packets with a plurality of processing modules into one or more processed-packet portions, the network processor coupled to an external memory, the method comprising:
receiving, by a shared on-chip system memory of the network processor, one or more processed-packet portions corresponding to one or more packet assemblies, each of the packet assemblies having one or more associated tasks, the packet assembly processor comprising an input queue configured to receive the one or more associated tasks for the packet assemblies;
constructing, by a packet assembly processor, an output packet for each packet assembly from the one or more processed-packet portions in accordance with instructions from the one or more tasks associated with the packet assembly;
coordinating, by the packet assembly processor, storage of the one or more processed-packet portions for each output packet that is read from the system memory based on the instructions from the one or more tasks associated with the corresponding packet assembly;
entering a drop mode upon detecting that a depth of the input queue has reached a threshold, wherein the drop mode comprises:
  removing an oldest task from the input queue;
  setting a drop indication in a state data entry corresponding to the packet assembly associated with the removed task;
  dropping one or more subsequent tasks from the input queue, without processing the tasks, until the input queue depth is below the threshold;
  setting a drop indication in a state data entry corresponding to the packet assembly associated with the one or more dropped tasks;
  removing the packet assembly having the drop indication set from the system memory without constructing an output packet, thereby avoiding transmitting corrupt output packets;
  sending an indicator to a destination device that a corresponding packet assembly was dropped; and
when the input queue depth is below the threshold:
  exiting the drop mode and processing an oldest task in the input queue.

* * * * *